US010682917B2

(12) United States Patent
Imberger

(10) Patent No.: US 10,682,917 B2
(45) Date of Patent: Jun. 16, 2020

(54) METHOD AND SYSTEM FOR RELEASING A POWER SUPPLY LINE TO SUPPLY POWER TO A VEHICLE

(71) Applicant: AUDI AG, Ingolstadt (DE)

(72) Inventor: Jörg Imberger, Ingolstadt (DE)

(73) Assignee: AUDI AG, Ingolstadt (DE)

(*) Notice: Subject to any disclaimer, the term of this patent is extended or adjusted under 35 U.S.C. 154(b) by 236 days.

(21) Appl. No.: 15/942,850

(22) Filed: Apr. 2, 2018

(65) Prior Publication Data
US 2018/0304762 A1     Oct. 25, 2018

(30) Foreign Application Priority Data
Apr. 25, 2017   (DE) .......................... 10 2017 206 959

(51) Int. Cl.
| | | |
|---|---|---|
| *B60R 16/02* | (2006.01) | |
| *B60S 5/00* | (2006.01) | |
| *B60L 11/18* | (2006.01) | |
| *B60L 53/60* | (2019.01) | |
| *B60L 53/65* | (2019.01) | |

(Continued)

(52) U.S. Cl.
CPC ......... *B60L 11/1846* (2013.01); *B60L 53/305* (2019.02); *B60L 53/31* (2019.02); *B60L 53/60* (2019.02); *B60L 53/65* (2019.02); *B60L 53/68* (2019.02); *B60L 53/14* (2019.02); *B60L 2250/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC . B60R 16/02; B60R 25/00; B60S 5/00; B60L 11/18; B60L 53/14; B60L 53/64; B60L 53/65; B60L 53/66
USPC .......................................................... 701/22
See application file for complete search history.

(56) References Cited

U.S. PATENT DOCUMENTS

| | | | |
|---|---|---|---|
| 2011/0106329 A1* | 5/2011 | Donnelly | .................. B60L 3/12 |
| | | | 700/291 |
| 2013/0110296 A1* | 5/2013 | Khoo | .................... B60L 53/665 |
| | | | 700/286 |

(Continued)

FOREIGN PATENT DOCUMENTS

| | | |
|---|---|---|
| CN | 106114248 A | 11/2016 |
| DE | 102011010809 A1 | 8/2012 |

(Continued)

OTHER PUBLICATIONS

Examination Report dated Mar. 2, 2018 of corresponding German application No. 102017206959.7; 10 pgs.

(Continued)

*Primary Examiner* — Tan Q Nguyen
(74) *Attorney, Agent, or Firm* — Maier & Maier, PLLC

(57) ABSTRACT

A method for releasing a locking system including a vehicle for a power supply line to supply power to the vehicle. A message is generated by a requesting user by a transmitter and relayed to a portable computer unit of a user of the vehicle. The message provides the user of the vehicle with an option to generate a control command for releasing the locking system. If the user of the vehicle should activate the option for generating the control command, the control command for releasing the locking system is generated and transmitted to the vehicle.

3 Claims, 1 Drawing Sheet

(51) Int. Cl.
*B60L 53/68* (2019.01)
*B60L 53/30* (2019.01)
*B60L 53/31* (2019.01)
*B60L 53/14* (2019.01)

(56) References Cited

U.S. PATENT DOCUMENTS

| | | | |
|---|---|---|---|
| 2013/0222111 A1* | 8/2013 | Inoue | G05B 1/01 |
| | | | 340/5.65 |
| 2014/0167695 A1* | 6/2014 | Shimizu | H01R 13/6275 |
| | | | 320/109 |
| 2014/0266004 A1 | 9/2014 | Andrews, Jr. | |
| 2015/0061594 A1* | 3/2015 | Hockenstrom | B60L 8/006 |
| | | | 320/109 |
| 2015/0134188 A1* | 5/2015 | Lowenthal | G07C 5/008 |
| | | | 701/29.3 |
| 2016/0264011 A1 | 9/2016 | Yasukawa et al. | |

FOREIGN PATENT DOCUMENTS

| | | |
|---|---|---|
| DE | 102012022949 A1 | 5/2013 |
| EP | 2 644 440 A2 | 10/2013 |
| WO | 2013/057587 A2 | 4/2013 |
| WO | 2013/137029 A1 | 9/2013 |

OTHER PUBLICATIONS

Search Report dated Oct. 16, 2018 in corresponding European Application No. 18163251.4; 12 pages including a partial machine generated English-language translation.

\* cited by examiner

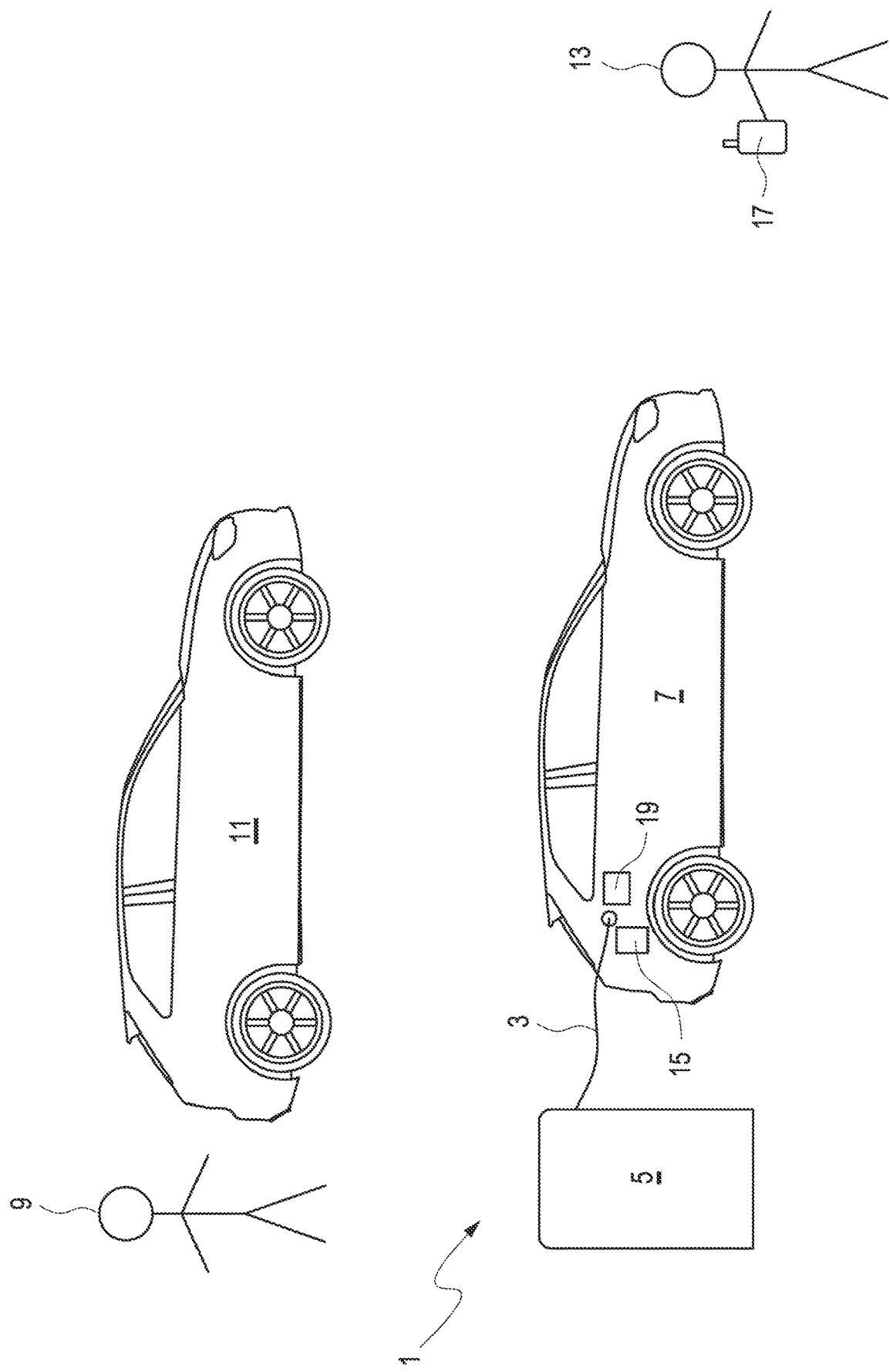

METHOD AND SYSTEM FOR RELEASING A POWER SUPPLY LINE TO SUPPLY POWER TO A VEHICLE

FIELD

The proposed invention relates to a method for releasing a locking system comprised by a vehicle for a power supply line to supply power to the vehicle and a system configured to carry out the proposed method.

BACKGROUND

Power supply stations are used for supplying vehicles with electrical power, in particular, and these stations have a number of power supply lines. In order to charge a particular vehicle with electrical power, for example, a power supply line is connected to the vehicle and attached to the vehicle by means of a locking system. Since a charging process for an electrically powered vehicle may extend over a lengthy period of time, the user of the vehicle is often at a distance from the vehicle.

But without a control command for releasing the locking system used for the attachment of the power supply line, the power supply line cannot be released from the vehicle. This means that a situation may arise in which a vehicle is parked fully charged at a power supply station, and a power supply line, which could be used to charge another vehicle, is blocked until such time as a user of the vehicle returns to the vehicle and provides the control command for releasing the locking system used for the attachment of the power supply line.

In the German document DE 10 2011 010 809 A1 a method is disclosed for securing a charging process of an electric vehicle, in which a locked charging socket can be unlocked via a mobile telephone.

The international publication WO 2013 137 029 A1 discloses a charging system for an electric vehicle with a remote control for unlocking a charging socket of the electric vehicle.

A locking system device for a charging socket of a motor vehicle is disclosed in the German publication DE 10 2012 022 949 A1.

SUMMARY

Against this background, an object of the proposed invention is to provide a possibility of releasing a locking system for a power supply line of a vehicle by a person not having any authorization to operate the vehicle.

In order to achieve the aforementioned object, a method is proposed for releasing a locking system comprised by a vehicle for a power supply line to supply power to the vehicle. For this, it is provided that a message is generated by a requesting user via a transmitter and relayed to a portable computer unit of a user of the vehicle. Furthermore, it is provided that the message provides the user of the vehicle with an option to generate a control command for releasing the locking system, and if the user of the vehicle should activate the release option for generating the control command for releasing the locking system, the control command for releasing the locking system is generated and transmitted to the vehicle by the portable computer unit of the user of the vehicle. Moreover, it is provided that the locking system of the vehicle is released in dependence on the receiving of the generated control command by a control instrument of the vehicle, whereby a releasing of the power supply line from the vehicle is made possible for the requesting user.

The proposed method serves, in particular, for the management of an access to a power supply line of a power supply station for providing energy to a vehicle.

According to the proposed method, it is provided that a locking system, by means of which the power supply line is attached to a particular vehicle and accordingly blocked for use by other users, can be released in dependence on a message from a user of the vehicle which is generated by a potential user of the power supply line, i.e., by a requesting user. For this purpose, it is provided according to the proposed method that a message is generated by the requesting user and relayed to the user of the vehicle, indicating to the user of the vehicle that the requesting user would like to use the power supply line or release it from the vehicle. On the basis of this message, the user of the vehicle may decide whether to release the locking system and thereby terminate the process of supplying energy to the vehicle or whether to continue the process of supplying energy to the vehicle and accordingly to deny the request.

In the event that the user of the vehicle wishes to grant a particular request for the releasing of the power supply line from the vehicle, it is provided according to the proposed method that the user of the vehicle in response to a message comprising the request can release the locking system for the attachment of the power supply line to the vehicle by means of a control command to be generated by using his portable computer unit. Accordingly, the user of the vehicle may employ his portable computer unit as a remote control for releasing the locking system for the attachment of the power supply line.

The control command for releasing the locking system for the attachment of the power supply line to the vehicle may be transmitted to the vehicle from the portable computer unit of the user, e.g., by using a communication interface, such as a mobile communication network.

Once the control command for releasing the locking system from the vehicle has been received, the control command is processed by a control instrument of the vehicle and the locking system is released. Accordingly, the requesting user may release the power supply line from the vehicle and connect the power supply line to his vehicle, for example.

In the context of the proposed invention, a power supply line is meant to be a line by which a vehicle is to be supplied with energy or a fuel. In particular, a power supply line may be a cable for the charging of an electrical energy storage or a fuel line for supplying a vehicle with fuel.

In the context of the proposed invention, a portable computer is meant to be a computer unit carried about by a user of a vehicle, such as a cell phone or a notebook computer.

In the context of the proposed invention, an option for generating a control command is meant to be a possibility of activating a process for generating the control command. Such a possibility may be, for example, a control icon represented on a touchscreen or a switch, button, or any other user interface suitable for activating a process for generating a control command.

In one possible embodiment of the proposed method, it is provided that the transmitter used to generate the message is a transmitter comprised by the vehicle, this transmitter being configured by means of an operating element arranged on an outer shell of the vehicle for the purpose of generating the message provided according to the invention, and to transmit the message to the portable computer unit of the user of the vehicle.

In order to generate the message provided according to the invention and in this case, to relay a request to a user of a vehicle, any user interface suitable for activating a control instrument for generating the message may be used. In particular, it is provided that an operating element arranged on a particular vehicle which is blocking a power supply line, such as, for example, a switch, a button, or a touch-sensitive screen, is activated or touched in order to generate the message provided according to the invention.

It is conceivable that a message in response to an input by a requesting user will be sent as feedback to the requesting user, for example by a status light. For this purpose, the status light may light up, blink, or change color, for example. Of course, any other device suitable for providing feedback may be used, such as a speaker or a buzzer, in order to indicate to the requesting user a message successfully relayed to the user of the vehicle or to a portable computer unit of the user of the vehicle.

By using an operating element arranged on a particular vehicle which is blocking a power supply line, a transmitter provided for generating the message provided according to the invention may be used to access a memory of the vehicle in order to determine connection information of the user, such as, for example a cell phone number.

In another possible embodiment of the proposed method it is provided that a portable computer unit of the requesting user is used as the transmitter for generating the message. In this case, it is provided that the requesting user, by means of the transmitter, detects at least one identification feature of the vehicle. Furthermore, it is provided that the at least one detected identification feature is used to determine connection settings for the transmission of the message provided to the portable computer unit of the user of the vehicle.

In order to dispense with an operating element on a particular vehicle, or to provide the message according to the invention to a user of a vehicle not having an operating element, it may be provided that a portable computer unit of a respective requesting user is used as the transmitter for generating and transmitting the message provided according to the invention.

In order to enable a portable computer unit of a particular requesting user to connect to a portable computer unit of a user of a particular vehicle, it may be provided that the portable computer unit of the requesting user detects or reads out an identification feature of the vehicle, such as a QR code or an RFID tag. With the aid of the identification feature, it is possible to ascertain particular connection settings, i.e., for example, a cell phone number of the user of the vehicle, for example by making use of a coordination table stored on a server, and to use this for transmitting the message provided according to the invention to the portable computer unit of the user of the vehicle.

In another possible embodiment of the proposed method, it is provided that a control instrument arranged at a power supply station connected to the power supply line is used as the transmitter.

It may be provided that the control instrument of the power supply station establishes a communication link with the vehicle in dependence on an activating of an operating element arranged at the power supply station via a communication interface, and connection settings are determined by the control instrument of the power supply station for transmitting the message to the portable computer unit of the user. Accordingly, it may be provided that the message is relayed by using the connection settings from the power supply station to the portable computer unit of the user of the vehicle.

In order for a potential user of a power supply station not having any portable computer unit to enter into contact with a user of a vehicle which is blocking a power supply line of the power supply station, to provide a possibility of releasing the power supply line from the vehicle, it may be provided that the power supply station itself is used to relay the message provided according to the invention to the user of the vehicle blocking the power supply line.

In order to establish a communication link between a particular power supply station and a portable computer unit of a user of a vehicle which is blocking a power supply line of the power supply station, it is provided that the power supply station is configured by means of an operating element, such as a switch, a button, a touch-sensitive pad or any other user interface suitable for relaying a control command to carry out a request process. In response to the input to carry out the request process, i.e., in response to the pressing of a button, for example, a control instrument of the power supply station connects across a communication interface, such as a WLAN network, to at least one vehicle connected by a power supply line to the power supply station and ascertains connection settings from the vehicle, such as, for example, a cell phone number for contacting a particular user of a particular vehicle. By using the respective connection settings, the message provided according to the invention is relayed to the user of the vehicle, whereupon the user may decide whether he would like to release the locking system for the attachment of the power supply line to his vehicle, providing a corresponding control command by means of the message, or whether he would like to continue the particular power supply process of providing power to the vehicle.

In another possible embodiment of the proposed method, it is provided that the connection settings for the transmission of the message to the portable computer unit of the user of the vehicle are read out from a memory of the vehicle.

In order to carry out the proposed method in a fast and simple manner, a user of a vehicle may store his connection settings in a memory of the vehicle and release them in order to carry out the proposed method. Of course, in this case, it may be provided that the connection settings are stored in the memory of the vehicle in anonymous and/or encrypted form.

In another possible embodiment of the proposed method, it is provided that the connection settings for the transmission of the message to the portable computer unit of the user of the vehicle are queried from a server via a communication interface making use of an identification feature read out from a memory of the vehicle.

By means of a server configured as a database for ascertaining of connection settings for contacting a user of a vehicle, a central facility may be provided to which, for example, only users specified in advance may have access, and by which, particular queries from users can be logged onto, thereby preventing a misuse of the connection settings.

In another possible embodiment of the proposed method, it is provided that the message relayed to the portable computer unit of the user is used to transmit at least one option for generating the control command for releasing the locking system, and to transmit information relating to a current full level of an energy storage unit of the vehicle to the portable computer unit of the user of the vehicle.

In order to assist a user of a vehicle who receives a message provided according to the invention in deciding whether to release the locking system for the attachment of the power supply line to the vehicle, a current state of charge or a current full condition of an energy storage unit of the vehicle may be indicated to the user, or may be relayed together with the message provided according to the invention.

In another possible embodiment of the proposed method, it is provided that a display element is arranged on the vehicle, and, in the event that the locking system has been released, the display element is switched from a first state to a second state, indicating to the requesting user the releasing of the locking system.

In order to provide a particular requesting user with feedback as to a message successfully relayed to a user of a vehicle blocking a particular power supply line, it may be provided that a successful transmission of the message provided according to the invention is reported back by means of a display element, such as, for example a light or an acoustic element. For example, a light may be switched to a continuous or blinking state or a speaker may be switched to a state in which the speaker generates a tone if the message provided according to the invention has been successfully transmitted to the user of the vehicle, and/or if the user has provided the control command according to the invention for the releasing of the locking system. Moreover, the proposed invention relates to a system for managing a power supply line of a power supply station for supplying power to a vehicle, with a transmitter and a portable computer unit of a user of a vehicle, wherein the transmitter is configured for the purpose of relaying a message, in dependence on a request of a requesting user, to the portable computer unit of the user of the vehicle. It is provided in this case that the message comprises an option for generating a control command to release a locking system for the attachment of the power supply line to the vehicle. Furthermore, it is provided that the portable computer unit is configured so that, in the event that the user of the vehicle activates the option for generating the control command for releasing the locking system to generate a control command to release the locking system, and, to transmit the control command to the vehicle, and wherein the vehicle comprises a control instrument which is configured for the purpose of releasing the locking system on the vehicle in dependence on the receiving of the control command generated by the portable computer unit of the user of the vehicle, whereby the power supply line can be released from the vehicle by the requesting user.

The proposed system serves, in particular, for carrying out the proposed method.

Further advantages and embodiments of the invention will emerge from the description and the accompanying drawings.

It is understood that the features mentioned above and those as yet to be explained below may be used not only in the particular indicated combination, but also in other combinations or standing alone, without leaving the scope of the present invention.

BRIEF DESCRIPTION OF THE DRAWING

The invention is represented schematically in the drawings on the basis of embodiments and shall be described schematically and at length with reference to the drawings.

FIG. 1 shows a schematic representation of one possible embodiment of the system according to the invention.

DETAILED DESCRIPTION OF THE DRAWING

FIG. 1 shows a system 1 for the managing of a power supply line 3 of a power supply station 5 for supplying a vehicle 7 with energy.

In the present case, the power supply line 3 of the power supply station 5 is blocked by the vehicle 7, so that a requesting user 9 cannot charge his vehicle 11. Since a user 13 of the vehicle 7 is not present in the immediate vicinity of the vehicle 7, the requesting user 9 cannot verbally contact the user 13 of the vehicle 7 to ask for a releasing of the power supply station.

In order to relay to the user 13 of the vehicle 7 a message asking for the releasing of the power supply line 3, the requesting user 9 activates a button 15 arranged on the vehicle 7, whereupon a control instrument of the vehicle 7 sends to the user 13 of the vehicle 7 a message to a portable computer unit 17. The message includes a control icon for providing a control command, resulting in the releasing of a locking system 19 for the attachment of the power supply line 3 to the vehicle 7.

In the present case, the user 13 of the vehicle 7 activates the control icon of the message, whereupon the control command is generated by the portable computer unit 17 and sent to the vehicle 7. In response to the reception of the control command, a control instrument of the vehicle 7 is configured to release the locking system 19 for the attachment of the power supply line 3 to the vehicle 7, and thereby free up the power supply line 3 for the requesting user 9 and make it possible for the requesting user 9 to charge the vehicle 11.

The invention claimed is:

1. A method for releasing a locking system comprising: a vehicle for a power supply line to supply power to the vehicle, in which a message is generated by a requesting user by a transmitter and relayed to a portable computer unit of a user of the vehicle, and in which the message provides the user of the vehicle with an option to generate a control command for releasing the locking system, wherein if the user of the vehicle should activate the option for generating the control command for releasing the locking system the control command for releasing the locking system, is generated and transmitted to the vehicle, wherein the locking system of the vehicle is released in dependence on the receiving of the generated control command by a control instrument of the vehicle, whereby a releasing of the power supply line from the vehicle is made possible for the requesting user, wherein the transmitter which generates and transmits the message of the requesting user is a transmitter of the vehicle, and the transmitter is configured to generate and transmit the message of the requesting user to the portable computer unit of the user of the vehicle in response to an actuation of an operating element arranged on an outer shell of the vehicle, wherein a display element is arranged on the outer shell of the vehicle near the operating element, and the display element is configured to indicate to the requesting user the releasing of the locking system in the event that the locking system has been released.

2. The method according to claim 1, wherein the message relayed to the portable computer unit of the user of the vehicle is used to transmit at least one option for generating the control command for releasing the locking system of the vehicle and information relating to a current level of an energy storage unit of the vehicle to the portable computer unit of the user of the vehicle.

3. A system for managing a power supply line of a power supply station for furnishing power to a vehicle, comprising:

a transmitter and a portable computer unit of a user of a vehicle, wherein the transmitter is configured to relay a message to the portable computer unit of the user of the vehicle, in dependence on a request of a requesting user, wherein the message includes an option for generating a control command to release a locking system for the attachment of the power supply line to the vehicle, and wherein the portable computer unit is configured so that, in the event that the user of the vehicle activates the option for generating the control command for releasing the locking system, a control command is generated to release the locking system, and the control command is transmitted to the vehicle, and wherein the vehicle includes a control instrument which is configured to release the locking system on the vehicle in dependence on the receiving of the control command generated by the portable computer unit of the user of the vehicle, whereby the power supply line is released by the requesting user from the vehicle, wherein the transmitter is a transmitter of the vehicle, and the transmitter is configured to generate and transmit the message of the requesting user to the portable computer unit of the user of the vehicle in response to an actuation of an operating element arranged on an outer shell of the vehicle, wherein a display element is arranged on the outer shell of the vehicle near the operating element, and the display element is configured to indicate to the requesting user the releasing of the locking system in the event that the locking system has been released.

\* \* \* \* \*